United States Patent
Ikeno

(10) Patent No.: US 8,218,159 B2
(45) Date of Patent: Jul. 10, 2012

(54) DATA PROCESSING APPARATUS FOR TRANSMITTING RESOURCES TO AN IMAGE PROCESSING APPARATUS

(75) Inventor: Hideo Ikeno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1565 days.

(21) Appl. No.: 10/674,493

(22) Filed: Oct. 1, 2003

(65) Prior Publication Data
US 2004/0061885 A1    Apr. 1, 2004

(30) Foreign Application Priority Data

Oct. 1, 2002 (JP) ............................. 2002-288879
Nov. 7, 2002 (JP) ............................. 2002-323818
Sep. 22, 2003 (JP) ............................. 2003-330403

(51) Int. Cl.
*G06K 1/00* (2006.01)
*B41F 1/00* (2006.01)

(52) U.S. Cl. ............ 358/1.13; 358/1.15; 358/1.9; 710/8; 710/11; 710/14

(58) Field of Classification Search .................. 358/1.13, 358/1.15, 1.9; 710/8, 11, 14
See application file for complete search history.

(56) References Cited

U.S. PATENT DOCUMENTS

| | | | |
|---|---|---|---|
| 6,101,506 A * | 8/2000 | Ukai et al. | 707/203 |
| 6,493,101 B1 | 12/2002 | Okazawa | 358/1.15 |
| 6,603,565 B1 * | 8/2003 | Scheidig et al. | 358/1.13 |
| 6,825,941 B1 * | 11/2004 | Nguyen et al. | 358/1.15 |
| 6,967,728 B1 * | 11/2005 | Vidyanand | 358/1.12 |
| 7,099,869 B1 * | 8/2006 | Forstall et al. | 707/10 |
| 7,120,646 B2 * | 10/2006 | Streepy, Jr. | 707/104.1 |
| 2001/0029530 A1 | 10/2001 | Naito et al. | 709/223 |
| 2003/0072030 A1 * | 4/2003 | Haines et al. | 358/1.15 |

FOREIGN PATENT DOCUMENTS

JP      8-30408      2/1996

* cited by examiner

*Primary Examiner* — King Poon
*Assistant Examiner* — Peter K Huntsinger
(74) *Attorney, Agent, or Firm* — Fitzpatrick Cella, Harper & Scinto

(57) ABSTRACT

A resource management method according to the present invention for managing a resource retained by an image forming apparatus that is capable of processing print data, which is based upon print languages of a plurality of types, using a specified resource, comprises a setting step of setting attributes, with regard to the resource, corresponding to each of the plurality of types of print languages processable by the image forming apparatus, and a storage step of storing the attributes, which have been set at said setting step, in the image forming apparatus in association with actual data of the resource retained by the image forming apparatus.

7 Claims, 13 Drawing Sheets

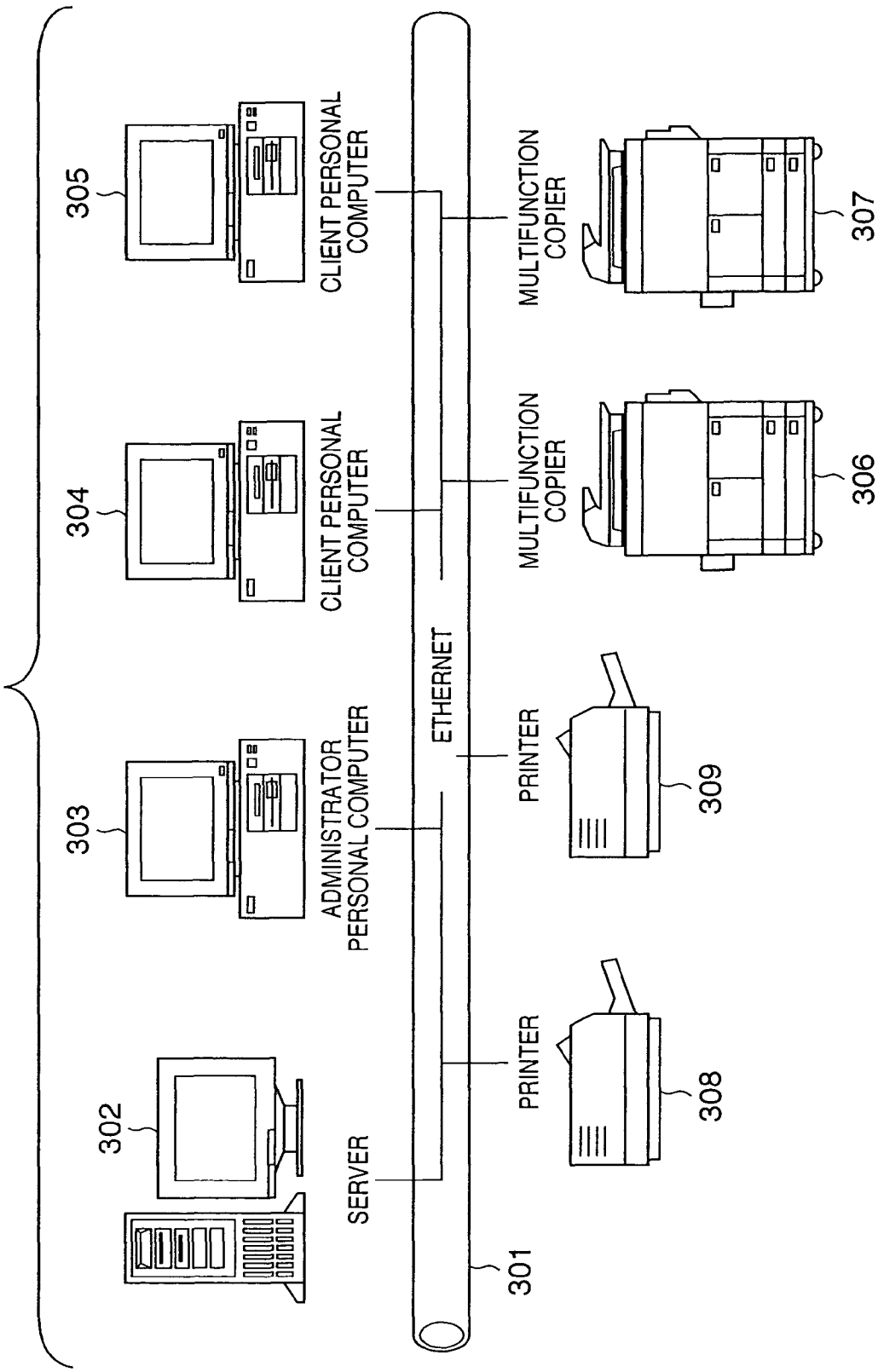

FIG. 4A

| NAME | ~ 401 |
| --- | --- |
| RESOURCE TYPE | ~ 402 |
| DEFAULT FLAG | ~ 403 |
| UTILIZATION FLAG | ~ 404 |
| DATA-PORTION INFORMATION | ~ 405 |
| DATA | ~ 406 |

| PDL1 | PDL2 | PDL3 | PDL4 | PDL5 |
| --- | --- | --- | --- | --- |
| 1 | 1 | 1 | 1 | 0 |

| PDL1 | PDL2 | PDL3 | PDL4 | PDL5 |
| --- | --- | --- | --- | --- |
| 0 | 1 | 1 | 1 | 0 |

FIG. 9

| | |
|---|---|
| BASIC I/O PROGRAM | ~ 1801 |
| SYSTEM PROGRAM | ~ 1802 |
| VARIOUS PROCESSING PROGRAMS | ~ 1803 |
| RELATED DATA | ~ 1804 |
| WORK AREA | ~ 1805 |

FIG. 10A

| | |
|---|---|
| RESOURCE TYPE | ~ 402 |
| NAME1 | ~ 1001 |
| NAME2 | ~ 1002 |
| NAME3 | ~ 1003 |
| NAMED-USED INFORMATION | ~ 1004 |
| DATA-PORTION INFORMATION | ~ 405 |
| DATA PORTION | ~ 406 |

| PDL1 | PDL2 | PDL3 | PDL4 | PDL5 |
|---|---|---|---|---|
| 3 | 1 | 1 | 0 | 2 |

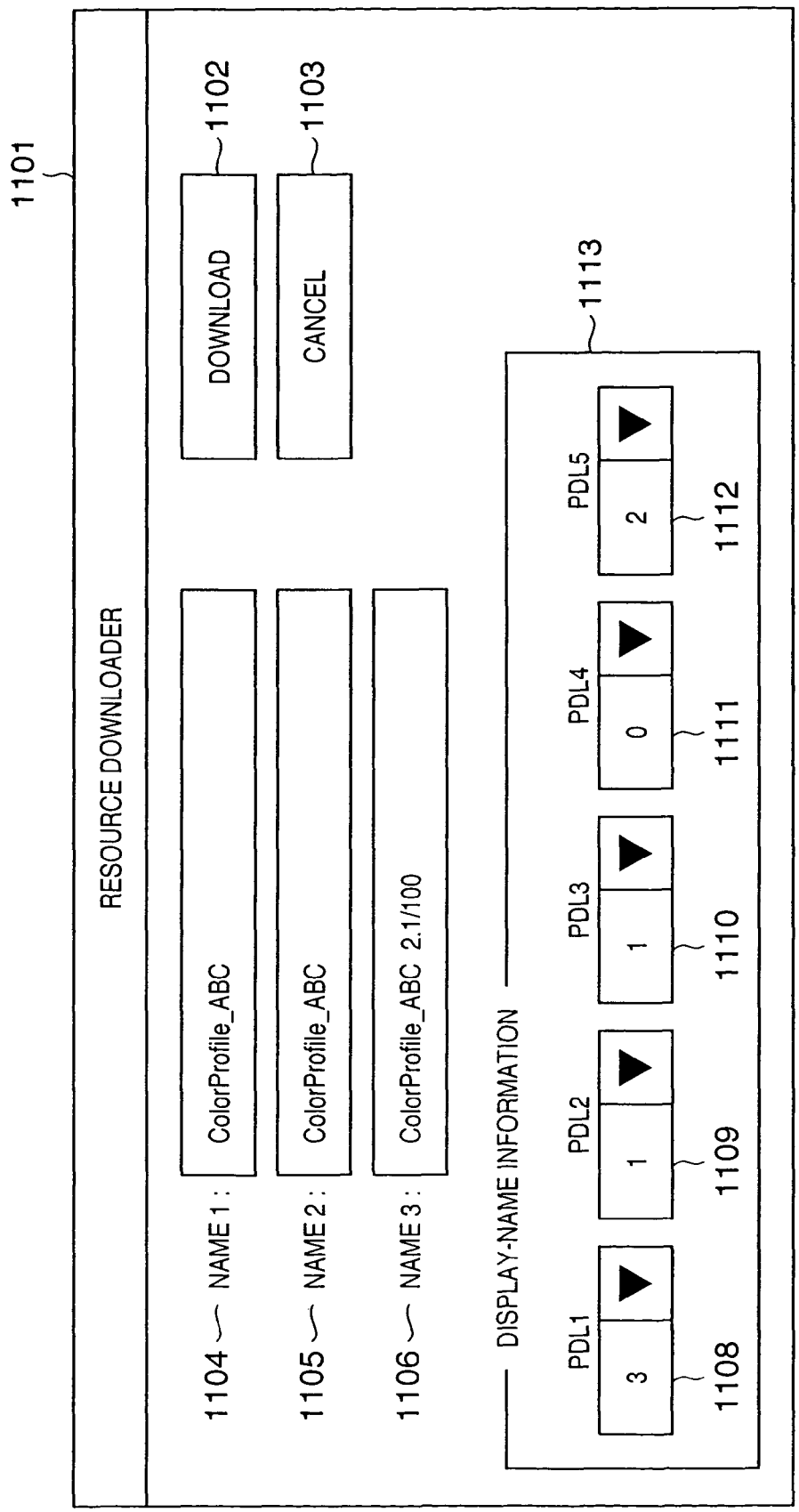

FIG. 13

STORAGE MEDIUM SUCH AS FLOPPY DISK OR CD-ROM

| DIRECTORY INFORMATION |
|---|
| FIRST DATA PROCESSING PROGRAM GROUP OF PROGRAM CODES CORRESPONDING TO STEPS IN FLOWCHART SHOWN IN FIG. 8 |
| SECOND DATA PROCESSING PROGRAM GROUP OF PROGRAM CODES CORRESPONDING TO STEPS IN FLOWCHART SHOWN IN FIG. 9 |
|  |

MEMORY MAP OF STORAGE MEDIUM

DATA PROCESSING APPARATUS FOR TRANSMITTING RESOURCES TO AN IMAGE PROCESSING APPARATUS

FIELD OF THE INVENTION

This invention relates to a data processing apparatus and resource management method for managing resources supplied for use in an image forming apparatus such as a printer or digital copier.

BACKGROUND OF THE INVENTION

In an image forming apparatus that accepts data in a plurality of print languages, any of methods (1) to (3) below is adopted in a case where resource data such as fonts, color profiles and dither patterns used in forming an image is retained within the apparatus.

(1) A special-purpose resource retention area for every print language is provided within the image forming apparatus, and only resource data utilized by a specific single print language is retained in each retention area together with resource attributes (information indicating a characterizing feature of the resource) regarding the specific single print language (for example, see the specification of Japanese Patent Application Laid-Open No. 08-030408). In this case, a program such as a printer driver that executes only processing relating to the specific print language refers only to the resource in the resource retention area for the print language that is to undergo processing. Further, a data processing program for managing all resources within the apparatus adopts each resource retention area exclusively for each print language provided within the apparatus as an object of processing, downloads data separately from host computers, etc., of the resources and sets the attributes.

(2) A special-purpose resource retention area for every print language is provided within the image forming apparatus, only resource data utilized by a specific single print language is retained in each retention area together with resource attributes (information indicating a characterizing feature of the resource) regarding the specific single print language, in a manner similar to that of (1) above, and a management module within the apparatus performs batch management. In this case, in response to a list request from a program such as a printer driver that executes only processing relating to the specific print language, and also in response to a command for download and setting of attributes from a data processing program that manages all resources within the apparatus, the management module within the apparatus discriminates the source of the request, the source of the command and the object of processing and executes processing that conforms to the result of discrimination.

(3) A single resource retention area used in common from each print language is provided within the image forming apparatus and all resources are retained in this area. In this case, processing for reference, setting of attributes and download from each program such as a printer driver that executes only processing relating to a specific print language and from a data processing program that manages all resources within the apparatus, is executed with respect to resources within the same resource retention area.

When various programs such as a printer driver in a data processing apparatus capable of communicating with the above-mentioned image forming apparatus use resources retained within a device, there are cases where resource candidates are displayed and are allowed to be selected by a user, etc. With such programs, resources are used through the methods set forth below.

A first method of use is such that since resources usable by each print language differ, a program dedicated to a certain print language (e.g., an application that supports only a specific language) will display only the resources that can be utilized by this program per se.

A second method of use is such that in a case where a plurality of resources within an apparatus are presented to a user collectively as a single resource in a program dedicated to a certain print language and use of this resource is commanded, the dedicated program decides appropriate resources used internally from the plurality of resources made to appear as a single resource. Furthermore, there are also cases where the contents of resources collected into a single resource are made to appear individually from a separate print-language dedicated program.

In addition, when the name of a resource is displayed, there are also cases where even though there is only a single resource, the resource is displayed under a separate name for each print language in accordance with limitations imposed by the specifications of the print language.

In accordance with these methods of using resources in a data processing apparatus, the following problems arise with the conventional method of resource retention:

With resource processing (1) according to the prior art, it is necessary to retain resources separately in each area dedicated to a print language even in relation to resources having common attributes and data regarding a plurality of print languages. As a consequence, resources within the apparatus are consumed superfluously. Further, it is required that a data processing program that manages all resources within the apparatus execute processing such as download separately even in relation to resources having common attributes and data regarding a plurality of print languages.

With resource processing (2) according to the prior art, it is necessary to retain resources separately in each area dedicated to a print language even in relation to resources having common attributes and data regarding a plurality of print languages, as in processing (1) above, and therefore resources within the apparatus are consumed superfluously.

With resource processing (3) according to the prior art, the premise is that resources within the apparatus have common attributes set with respect to all print languages and all are capable of being utilized in the same manner. Consequently, with regard to a resource for which the attributes concerning a plurality of print languages differ even though the data is common, the same resource is retained under a different name. This pertains to a resource that cannot be used with a certain specific print language, or to a resource which, even though it is a default resource with respect to a certain print language (a resource specified beforehand for use in a case where is no particular designation made in individual print jobs concerning the resource utilized), is not a default resource with respect to another language.

Further, besides the method of retaining one resource under separate names, there are also cases where processing is executed in order to display one resource by a name on a per-print-language basis. This is processing for displaying the name of a resource contained in an apparatus upon converting the resource name based upon information held beforehand by each program dedicated to a print language. In this case, the conversion processing cannot be executed in relation to a resource for which information does not previously exist on the side of the print-language dedicated program, as in the manner of a resource created and downloaded to the apparatus by a user, and therefore a method of displaying such a resource under a separate name for each and every print language does not exist.

Further, in a case where a resource that cannot be used with a certain specific print language exists, processing is executed in which the dedicated program for this print language filters information relating to a resource that the computer itself cannot use upon recognizing this information beforehand. However, this program also cannot deal with a resource that does not possess the information, e.g., a resource created and downloaded to the apparatus by a user. Consequently, a resource is displayed regardless of the fact that it is not clear whether the resource can or cannot be used with the print language. Alternatively, processing that arranges it so that a resource devoid of information will not be handled is executed.

Accordingly, an object of the present invention is to provide a data processing apparatus, resource management method and image forming apparatus through which resources can be utilized appropriately by the image forming apparatus without retaining resources redundantly in an image forming apparatus that supports a plurality of print languages and, moreover, by furnishing one retained resource with a name and/or attribute corresponding to each of the plurality of print languages.

SUMMARY OF THE INVENTION

According to the present invention, the foregoing object is attained by providing a resource management method for managing a resource retained by an image forming apparatus that is capable of processing print data, which is based upon print languages of a plurality of types, using a specified resource, comprising: a setting step of setting attributes, with regard to the resource, corresponding to each of the plurality of types of print languages processable by the image forming apparatus; and a storage step of storing the attributes, which have been set at the setting step, in the image forming apparatus in association with actual data of the resources retained by the image forming apparatus.

Preferably, the method further comprises a download step of downloading actual data of a resource to the image forming apparatus, wherein the storage step stores attributes regarding the resource in association with the actual data of the resource downloaded at the download step.

Preferably, an attribute indicating whether a resource is utilizable with each print language is included as an attribute corresponding to each of the plurality of types of print languages, and the method further comprises a list display step of reading the attributes that have been stored in association with the resource retained by the image forming apparatus and displaying attributes regarding a resource utilizable by a specific print language.

Preferably, an attribute indicating whether a resource is utilized as a default with each print language is included as an attribute corresponding to each of the plurality of types of print languages, and the list display step displays attributes, which concern a resource specified as a default in regard to a specific print language, in such a manner that this fact can be recognized.

Preferably, a name of a resource corresponding to each print language is included as an attribute corresponding to each of the plurality of types of print languages, and the list display step displays a resource name, which has been specified with regard to each print language, in such a manner that this fact can be recognized.

Preferably, the resources are a font resource used in printing, and/or a form resource for forming an image by being superimposed on print data at the time of printing, and/or a color-profile resource that expresses color space of an input/output device, and/or a look-up-table resource, which is a conversion table for color correction in color processing, and/or a dither-pattern resource, which is pattern data that decides expression of color in color processing.

Further, according to the present invention, the foregoing object is attained by providing a data processing apparatus for use with an image processing apparatus (e.g., a printer 308 or 309 or an multifunction copier 306 or 307 shown in FIG. 3) in which resources utilized in image processing within the image processing apparatus are retained together with information indicating features of the resources on a per-resource basis, print data or input data based upon print languages of a plurality of types is received, and image data is processed while utilizing resources that are retained within the apparatus from an initial state, or that are downloaded, in accordance with a resource utilization command sent together with the print data or input data, wherein the data processing apparatus comprises first setting means for setting, with respect to each resource within the image processing apparatus, two or more items of display-name information as information indicating the features of these resources (for example, setting is achieved by having a CPU 1701 shown in FIG. 8 execute a control program such as a downloader stored on a hard disk 1705) and second setting means for setting, with respect to each resource within the image processing apparatus, display-name information, which indicates names used in display, as information indicating features of these resources, the display-name information being set for every print language received by the image processing apparatus (for example, setting is achieved by having the CPU 1701 shown in FIG. 8 execute a control program such as a downloader stored on a hard disk 1705).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram illustrating an example of an environment in which use is made of a data processing apparatus according to the embodiment and an image forming apparatus to which processing is to be applied;

FIGS. 4A, 4B and 4C illustrate the structure of resources according to the embodiment;

FIG. 9 is a diagram illustrating the structure of a memory map in a RAM at the time of downloader execution;

FIGS. 10A and 10B are diagrams illustrating the structure of resource data retained on a hard disk of the multifunction copier shown in FIG. 1 or in a storage device of the printer shown in FIG. 2;

FIG. 11 is a diagram illustrating an example of a control screen displayed on a monitor shown in FIG. 8;

FIG. 13 is a diagram useful in describing a memory map of a storage medium that stores various data processing programs capable of being read out by the data processing apparatus of the present invention.

DETAILED DESCRIPTION OF THE PREFERRED EMBODIMENTS

[First Embodiment]

Figure 1:
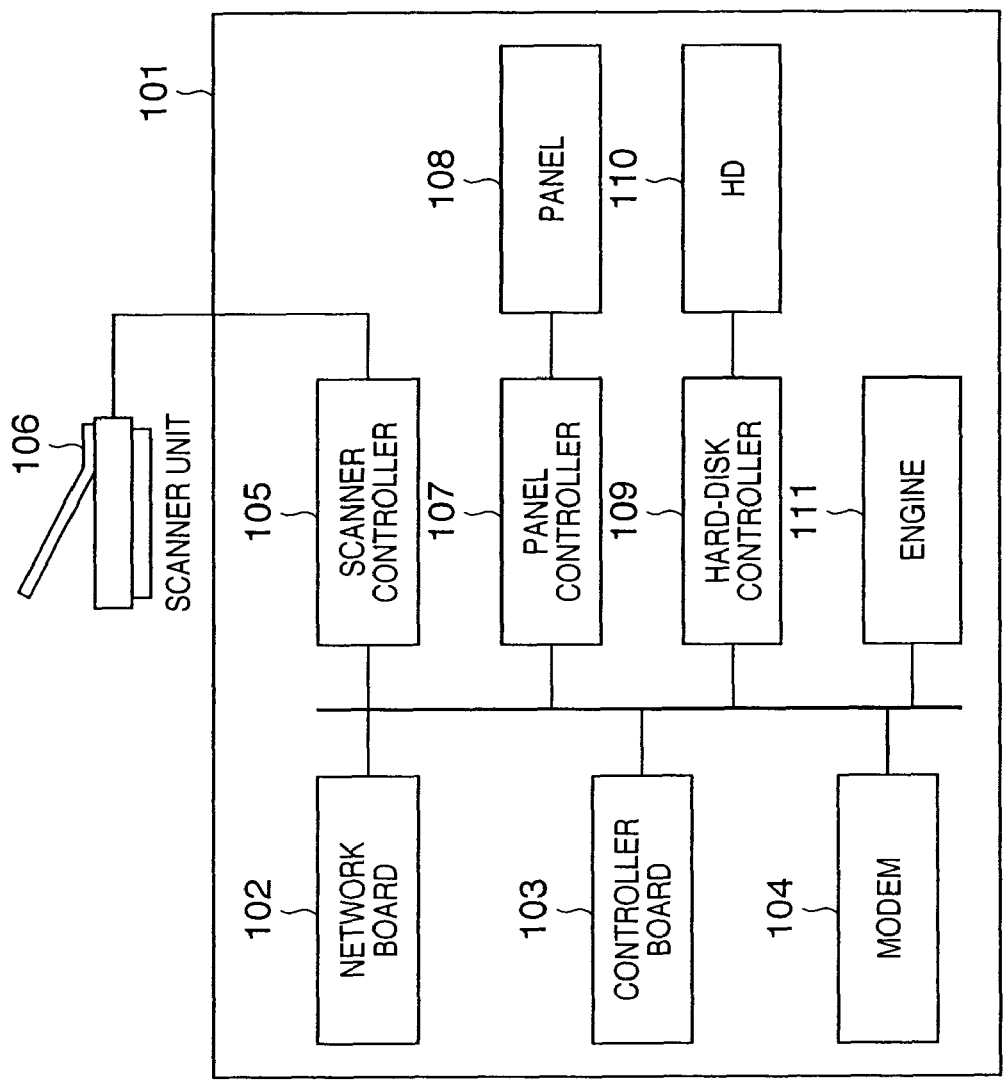
FIG. 1 is a block diagram illustrating the structure of a multifunction copier, which is one example of an image forming apparatus according to an embodiment of the present invention.

A downloader (download program) implemented by a computer will be described as an embodiment of a data processing apparatus according to a first embodiment of the present invention. The downloader manages resources and downloads the resources to an image forming apparatus. FIG. 1 is a diagram illustrating the hardware modules of a multifunction copier, which is one example of an image forming apparatus to which resources are downloaded by the downloader of this embodiment.

<Structure of Image Forming Apparatus>

The image forming apparatus has a main unit 101, which is for implementing the printing function of the apparatus. The main unit 101 functions also as a printer connected to a computer. The main unit 101 comprises a network board 102, a controller board 103, a modem 104, a scanner controller 105, a panel controller 107, a panel 108, a hard-disk (HD) controller 109, a hard disk (HD) 110 and an engine 111, which are electrically interconnected.

This apparatus will function as a copier by connecting a scanner unit 106 to the main unit 101. The network board 102 remotely connects this copier, via a network line such as a LAN, to an external device, such as a personal computer (PC), that functions as a data transmitting device and control device. An example of a higher layer protocol of the LAN is TCP/IP.

The controller board 103 has a processor, a memory and an I/O interface. The processor controls the overall copier by executing a prescribed program and also executes processing relating to resource management, described later.

The controller board 103 locally connects this copier and an external device such as a personal computer via an interface such as an SCSI or USB. Furthermore, the controller board 103 interprets data that has been accepted from the network board 102, the controller board 103 itself, the modem 104, the scanner controller 105 and the panel controller 107, forms an output image in cooperation with the hard-disk controller 109, and delivers the image to the engine 111.

The modem 104 remotely connects this copier and an external device such as a personal computer via a telephone line. The panel controller 107 provides a user interface as part of the function of the copier and controls the panel 108, which accepts commands from the user. The hard-disk controller 109 controls the hard disk 110, which is a storage area for data within the copier. The hard disk 110 is also a location for storing resources utilized by the copier. The engine 111 accepts an image formed by the controller board 103 and executes print processing.

The hard-disk controller 109 controls the hard disk 110, which is a storage area for data within the copier. The hard disk 110 is also a location for storing resources relating to the present invention. The engine 111 accepts an image formed by the controller board 103 and executes print processing.

Figure 2:
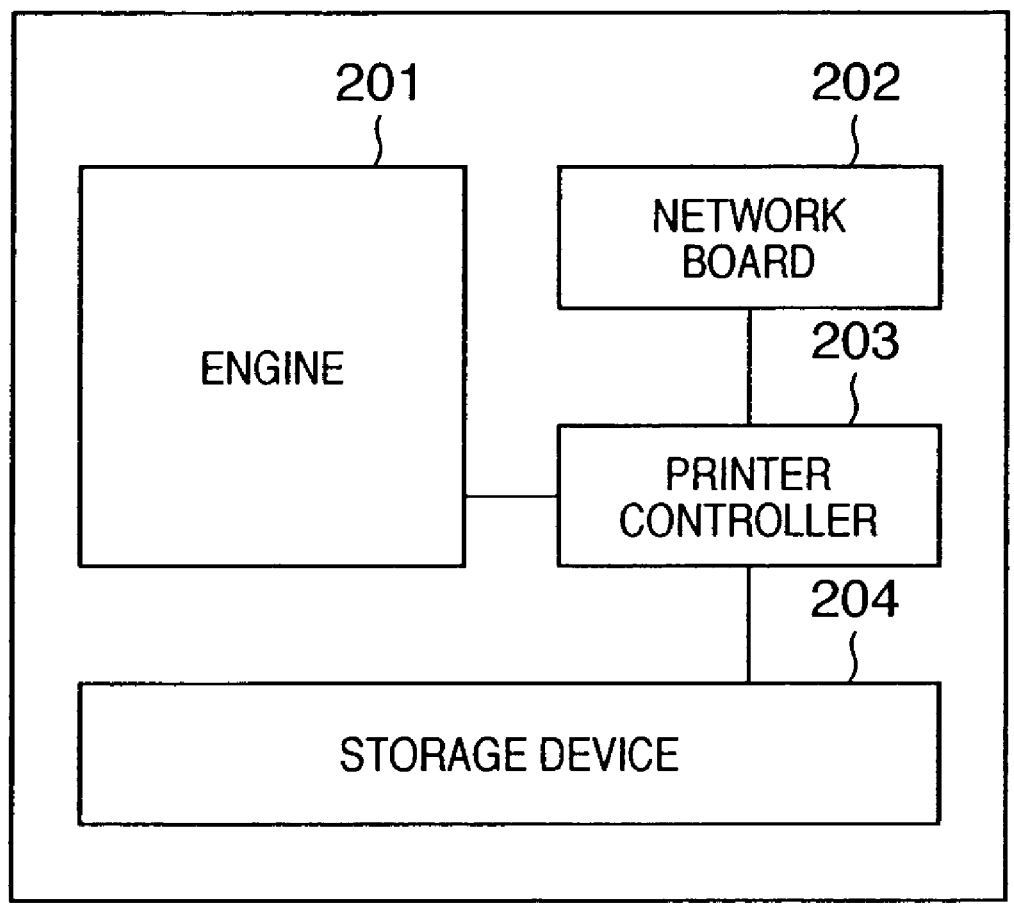
FIG. 2 is a block diagram illustrating the structure of a printer, which is one example of an image forming apparatus according to an embodiment of the present invention.

FIG. 2 is a diagram illustrating the hardware modules of a printer serving as one more example of an image forming apparatus. As shown in FIG. 2, a network board 202 remotely connects this printer, via a network line, to an external device, such as a personal computer, that functions as a data transmitting device and control device. A printer controller 203 has a processor and memory. A processor controls the overall printer by executing a prescribed program and executes processing relating to resource management, described later.

The printer controller 203 locally connects this copier and an external device such as a personal computer via an interface such as an SCSI or USB. Furthermore, the printer controller 203 interprets data that has been accepted from the network board 202 and printer controller 203 itself, forms an output image in cooperation with a storage device 204 and delivers the image to an engine 201. The storage device 204 is a storage area for data within the printer and is a non-volatile memory or hard disk. Resources utilized by the printer are also stored in the storage device 204. The engine 201 accepts the image formed by the printer controller 203 and executes print processing.

<Description of Resources>

Resources utilized by the image forming apparatus of FIG. 1 or FIG. 2 will be described next. The resources according to the present invention are data stored on the hard disk 110 or in the storage device 204. When the controller board 103 or printer controller 203 forms an output image, the data is referred to in order to execute image formation processing and color processing.

Examples of types of data are (1) fonts, which are character sets, (2) forms for printing an image superimposed on print data, (3) profiles that express the color spaces of various devices, (4) look-up tables (LUTs), which are conversion tables for color correction, and (5) dither patterns, namely pattern data that decide expression of colors.

Data stored as a resource comprises data proper (actual data) and information (resource attributes) indicating features of the data, particularly name and data size. Resources can be downloaded from an external device such as a personal computer functioning as a data transmitting device or control device connected to the image forming apparatus, and can be uploaded to an external device. Further, it is possible for attributes to be set and viewed with regard to resources retained in an external device. In addition, there are also resources that have been stored in the image forming apparatus in its initial state (e.g., at the time of shipping). Resources downloaded to the image forming apparatus are generated by software in a special-purpose apparatus or in a personal computer.

FIG. 3 is a diagram useful in describing an example of an environment in which use is made of resources and an image forming apparatus according to the present invention.

A typical environment in which the image forming apparatus is used is a network system relying upon a LAN connection with computers in an office or the like. The network system depicted in FIG. 3 includes a server 302, an administrator personal computer 303, client personal computers 304, 305, printers 308, 309 having the structure shown in FIG. 2, and multifunction copiers 306, 307 having the structure shown in FIG. 1. The components are connected via an Ethernet (registered trademark) 301.

The client personal computers 304, 305 in this environment transmit print data to the printers 308, 309 and multifunction copiers 306, 307 via printer drivers that operate in the client personal computers, and obtain a print output. Further, the client personal computers 304, 305 read in images by the scanner units 106 of the multifunction copiers 306, 307 via scanner drivers that operate in the client personal computers. It should be noted that the administrator personal computer 303 also is capable of performing print-out and scanner read operations as a client personal computer.

In a case where resources held by the server 302 and administrator personal computer 303, etc., are downloaded to the printers 308, 309 and multifunction copiers 306, 307, downloading is performed by the download program running on the administrator personal computer 303. The download program downloads resources, which have been acquired from the server 302 or another connected device, to the printers 308, 309 and multifunction copiers 306, 307, while setting various information, via a storage medium or Ethernet (registered trademark) 303. Further, it is possible for resources that have been uploaded from any of the printers 308, 309 and multifunction copiers 306, 307 to be downloaded to another device.

FIGS. 4A to 4C illustrate the structure of one collection of resource data retained in the storage device 204 of the printers 308, 309 or on the hard disk 110 in the multifunction copiers 306, 307.

In FIG. 4A, a resource name 401 is utilized as one means of identifying resources in a simple manner. This name is also utilized in a case where a resource list is indicated to the user. A resource type 402 indicates the type of resource. In this embodiment, a case where the downloader handles profile resources defining the color space of a device will be described as an example, and therefore a resource to undergo processing will be a profile and the resource type 402 will indicate a profile. In addition, fonts, forms, dither patterns and look-up tables may be indicated as the content of resource type 402.

A default flag 403 is a flag that indicates the resource used in a case where received data such as print data does not contain an indication as to which resource should be utilized. The default flag 403 has a structure shown in FIG. 4C. The image forming apparatus of this embodiment is capable of accepting five types of print languages, namely PDL1, PDL2, PDL3, PDL4 and PDL5, and of interpreting these languages and forming images. The default flag 403 has bits corresponding to respective ones of the five print languages. Each bit indicates, by its value, whether the particular resource is to be a default resource in relation to each print language. Here the particular resource is a default resource in regard to a print language that corresponds to an ON ("1") bit, and is not a default resource in regard to a print language that corresponds to an OFF ("0") bit. In the example of FIG. 4C, the default flag 403 is such that bits are OFF ("0") with regard to PDL1, PDL5, thereby indicating that this resource is not to be a default resource in relation to PDL1 (print language 1) and PDL5 (print language 5). Further, the default flag 403 is such that bits are ON ("1") with regard to PDL2, PDL3, PDL4, thereby indicating that this resource is to be a default resource in relation to PDL2 (print language 2) PDL3 (print language 3) and PDL4 (print language 4).

A utilization flag 404 indicates whether the resource is utilizable (to be utilized) or not and has the structure shown in FIG. 4B. The utilization flag 404 has bits corresponding to respective ones of the five print languages. Each bit indicates, by its value, whether the resource is utilizable in relation to each print language. Here the particular resource is utilizable in regard to a print language that corresponds to an ON bit, and is not utilizable in regard to a print language that corresponds to an OFF bit. In the example of FIG. 4B, the utilization flag 404 is such that bits are OFF ("0") with regard to PDL5, thereby indicating that this resource cannot be utilized in relation to PDL5 (print language 5). Further, the utilization flag 404 is such that bits are ON ("1") with regard to PDL1, PDL2, PDL3, PDL4, thereby indicating that this resource can be used in relation to PDL1 (print language 1), PDL2 (print language 2) PDL3 (print language 3) and PDL4 (print language 4).

Data-portion information 405 indicates the details of a data portion 406 and contains data size, etc. The data portion 406 contains the data proper, such as a font, form or profile, which is a resource. In this embodiment, the data proper is profile data of an image forming apparatus.

In this embodiment, individual resources are managed through the structure shown in FIGS. 4A to 4C and are uploaded or downloaded between the administrator personal computer 303, printers 308, 309 and multifunction copiers 306, 307. Furthermore, in this embodiment, a resource managed by the administrator personal computer 303 or server 302 is composed of resource substance (the resource proper), namely the data-portion information 405 and data portion 406; it does not contain resource attributes, namely resource name 401, resource type 402, default flag 403 and utilization flag 404. Accordingly, what is downloaded is the data-portion information 405 and data portion 406. The resource attributes are added on at the particular apparatus, such as the image forming apparatus. It should be noted, however, that this does not hamper the management of resource attributes at the administrator personal computer 303 or server 302, and the attributes can also be managed at the administrator personal computer 303 and server 302 in the form illustrated in FIGS. 4A to 4C.

The reason why the present invention is useful is because of the following: Color multiple-PDL (Page Description Language) machines have been developed. These machines, such as multifunction copiers and printers, support color as well as a variety of PDLs. A color profile corresponding to each PDL is prepared for a color-supporting machine that is such a multiple-PDL machine. A color profile is a conversion table used to apply a suitable color correction by adjusting color in the working environment (represented by a monitor, for example) in which an image that is input from a scanner or digital camera is captured, and in a printing environment (represented by a laser printer, large-scale printing machine or multifunction machine, etc.) in which the image is printed.

Accordingly, there are instances where a color profile, which is one example of a resource, is prepared for every language. For example, in this embodiment, the set-up can be such that when a PDL referred to as "A" is used, a color profile A is loaded in accordance therewith, and when a PDL referred to as "B" is used, a color profile B is loaded in accordance therewith. Thus, the appropriate color profile to be used at the time of data processing can be set by the user in association with each type of PDL.

If this arrangement is adopted, a profile that is optimum for each PDL can be loaded automatically. For example, in a case where an user who is not familiar with the color processing has set up the system so as to use a PDL language suited to printing in business-oriented applications where clear color development is desired, a color profile suited to sharp color development and conforming to this PDL is loaded automatically. Further, in a case where the user just selects and uses another PDL suitable for professional use, a color profile that has been determined to be a standard in industries that employ this other PDL would be loaded automatically.

Thus, as described above, a color profile can be conceived of as an example of a resource, as in this embodiment, and a user, merely by previously setting color profiles corresponding to respective ones of PDLs as resources, can print in the most suitable color simply by selecting the desired language without needing to concerning him/herself with the complicated settings to select color profiles suitable for a PDL which is desired by the user to use for a printing process when the printing process runs.

<Computer Structure>

Figure 8:
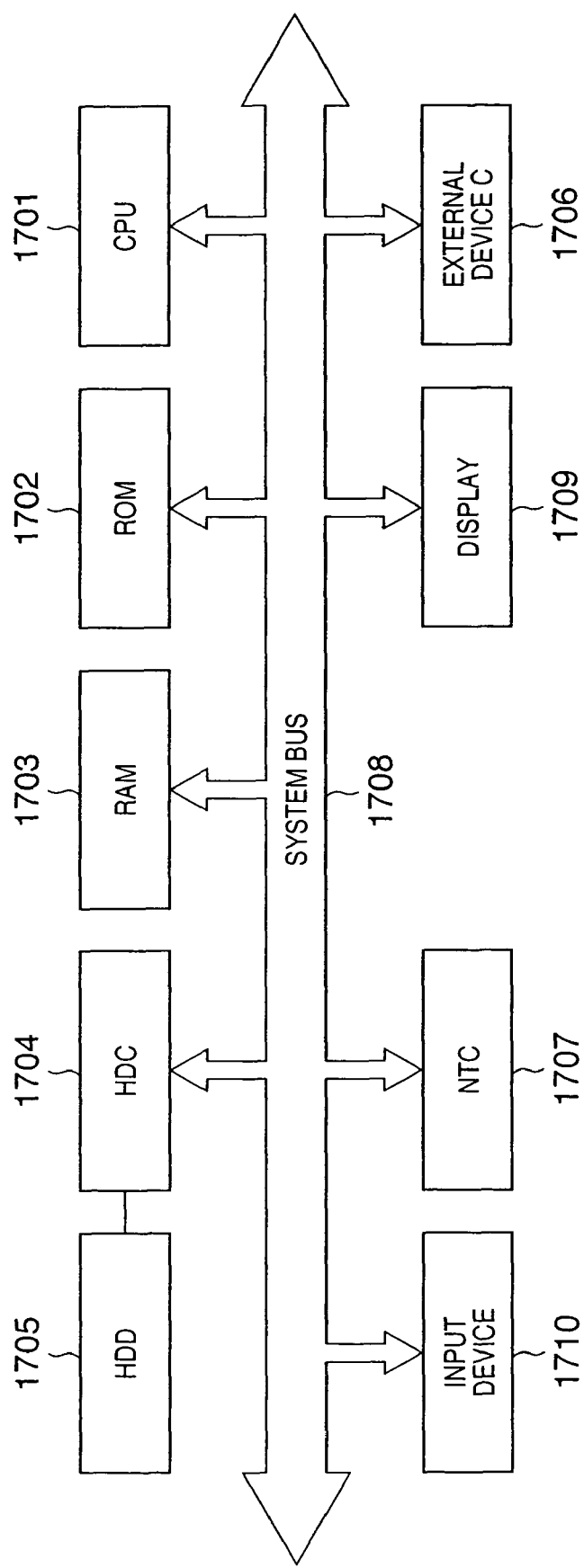
FIG. 8 is a block diagram useful in describing the structure of a computer.

FIG. 8 is a block diagram useful in describing the structure of a computer such as the administrator personal computer 303 or client personal computers 304, 305.

A CPU 1701 is a central processing unit for controlling the overall apparatus. While utilizing A RAM 1703 as a work area, the CPU 1701 executes various processing, inclusive particularly of resource download processing, in accordance with a program that has been stored in a ROM 1702, hard disk 1705, a portable storage medium such as a CD set in a device connected via an external-device controller 1706, or a device connected via a network controller 1707. A system bus 1708 is a path by which various data and control signals are exchanged among the above-described components. In addition to various programs, resource data, such as character pattern data (font data) and profile data, downloaded to the image forming apparatus, has been stored in the ROM 1702 and hard disk 1705.

A hard-disk controller 1704 controls the operation of the hard-disk drive that the computer utilizes as one storage device. If second and third new hard-disk drives are added to computer, then the hard-disk controller 1704 will control the operation of each of these drives. An external-device controller 1706 controls storage devices and input/output devices such as a floppy disk (FD), CD, DVD, MO, CD-R drive, scanner and printer connected to the computer by SCSI, USB and parallel interfaces, etc. The network controller 1707 controls an exchange of data performed among various devices (e.g., various devices connected to Ethernet 301 in this embodiment) via the network. A monitor 1709 is a display unit that presents a download control screen to begin with and, in addition, displays information from various programs. An input device 1710 is a device such as a keyboard or mouse by which the operator applies commands to the apparatus. Further, programs executed by the CPU 1701, beginning with a processing program according to this embodiment, have been written in computer language.

<Downloader Operation>

FIG. 9 is a diagram illustrating a memory map for when a processing program such as a downloader in accordance with the present invention has been loaded in the RAM 1703 at execution of the program. In the RAM 1703, the memory map is composed of a basic I/O program 1801 for input/output relative to the computer, a system program (operating system) 1802 that provides each processing program with an operating environment, various processing programs 1803 beginning with a downloader described later, a related area 1804 for storing related data inclusive of resource data, and a work area 1805 utilized temporarily when various programs are run. In a case where the storage capacities of the areas utilized as the areas 1801 to 1805 in the memory map become inadequate owing to a limitation upon the capacity of RAM 1703, a separate storage medium such as the hard disk 1705 can be treated as part of the area of RAM 1703.

The downloader program can be supplied to another computer via a storage medium such as floppy disk, hard disk, magneto-optic disk or CD-ROM or via a network, it is possible to achieve start-up from these storage media, and it is also possible to achieve start-up in the apparatus (i.e., a hard disk) after installation.

Figure 6:
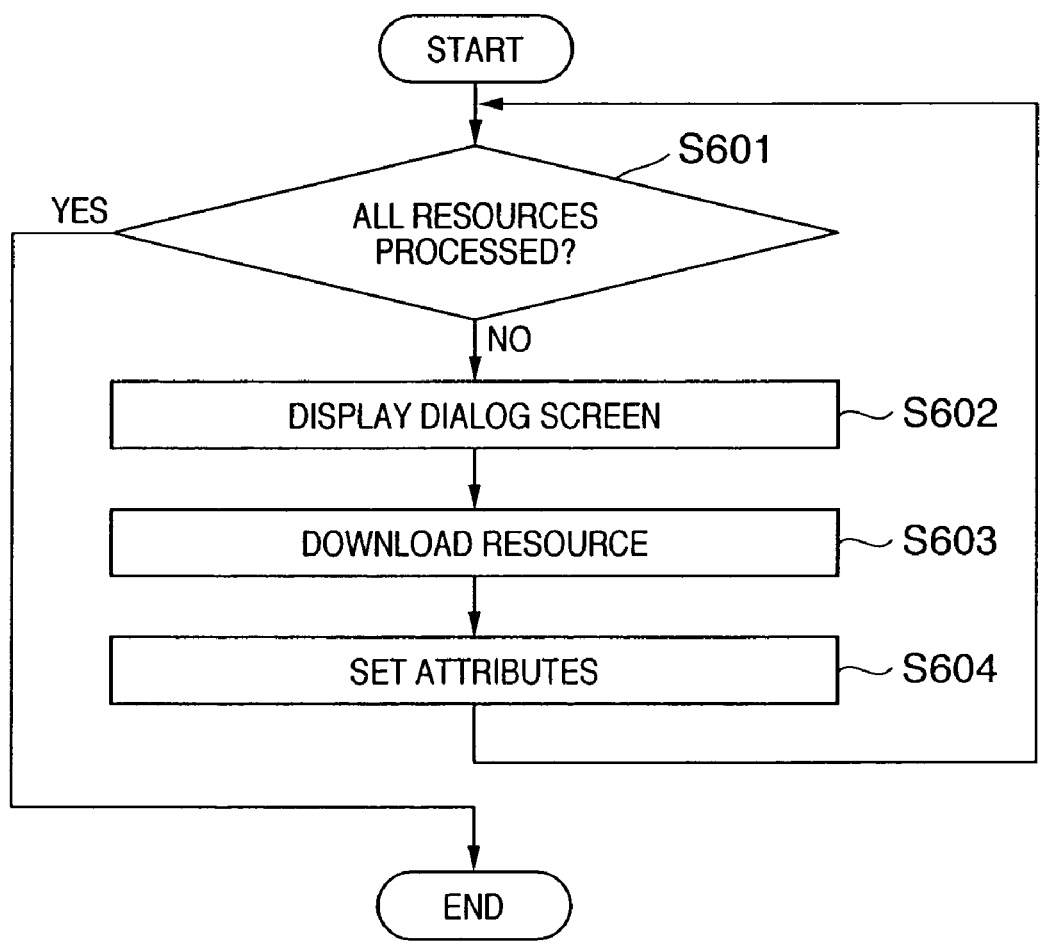
FIG. 6 is a flowchart of the downloader according to this embodiment.

FIG. 6 is a flowchart illustrating the flow of processing of a downloader at the administrator personal computer 303 of this embodiment. The downloader is adapted so as to be capable of downloading a plurality of resources successively one at a time. The procedure shown in FIG. 6 is written starting from the moment the downloader is launched via the operating system in response to a command from a user, etc. It should be noted that the apparatus to which resources are downloaded and the resources to be downloaded have been selected via a graphical user interface (GUI) following launching of the downloader.

First, it is determined at step S601 whether all resources to be downloaded have been processed or not. If it is determined that the processing of all resources to be downloaded has not been finished ("NO" at step S601), the processing of steps S602 to S604 below is executed with regard to the next resource to be processed, then control returns to step S601. If it is determined that the processing of all resources to be downloaded has been finished ("YES" at step S601), then processing is exited.

Figure 5:
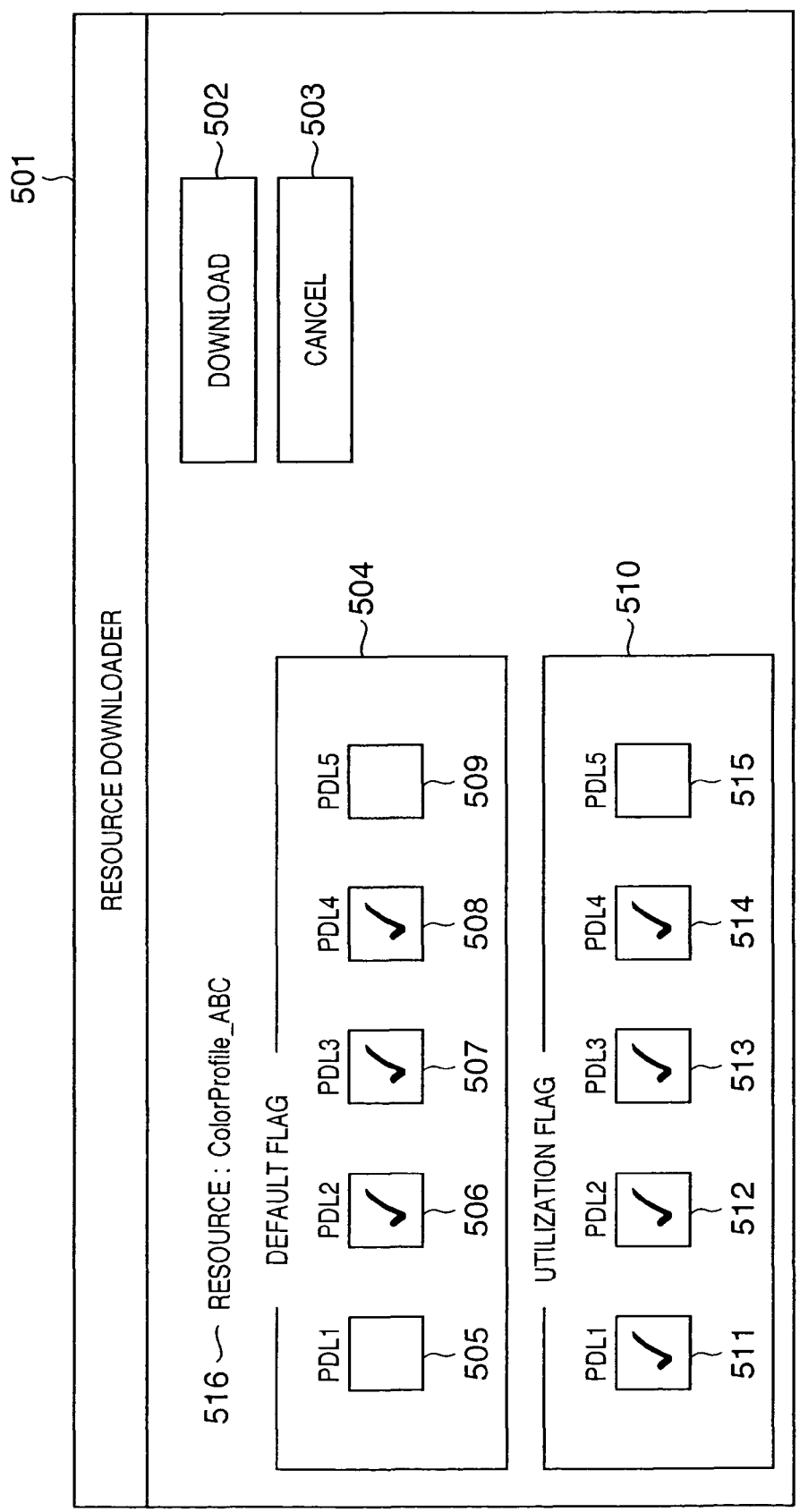
FIG. 5 is a diagram illustrating the user interface of a downloader in the embodiment.

At step S602, a dialog screen 501 shown in FIG. 5 is displayed so that the setting of resource attributes by the user will be accepted. FIG. 5 is one control screen that the resource downloader of this embodiment displays on the monitor 1709 and allows the attributes of downloaded resources to be set.

Resource name 516 displays the name of a resource to undergo processing. The downloader of this embodiment handles a profile resource as a resource to undergo processing, and at the present time a resource named "Color Profile ABC" is about to be downloaded. The name of this resource may be the name of a file in which the resource data is held in the administrator personal computer 303. Further, the resource name can be specified by the user and written, together with flags described later, into a resource-name section that has been downloaded to the image forming apparatus.

A default-flag setting section 504 is a user interface for setting the default flag of the resource indicated at the resource name 516 and has check boxes 505, 506, 507, 508 and 509. The check boxes 505, 506, 507, 508, 509 are analogous to the default flag bits corresponding to PDL1, PDL2, PDL3, PDL4, PDL5, respectively. If a check box is checked, then the corresponding default flag bit is set to "1" to specify the particular PDL as a default. It should be noted, however, that the values specified by the check boxes are not reflected in resource data directly; they are reflected after the data portion 406, which is the substance of the resource, is downloaded by clicking a download button 502.

A utilization-flag setting section 510 is a user interface for setting the utilization flag of the resource indicated at the resource name 516 and has check boxes 511, 512, 513, 514 and 515. The check boxes 511, 512, 513, 514, 515 are analogous to the utilization flag bits corresponding to PDL1, PDL2, PDL3, PDL4, PDL5, respectively. If a check box is checked, then the corresponding utilization flag bit is set to "1" to specify that the resource is utilizable. It should be noted, however, that the values specified by the check boxes are not reflected in resource data directly; they are reflected after the data portion 406, which is the substance of the resource, is downloaded by clicking the download button 502.

The download button 502 is for executing downloading of the resource indicated at the resource name 516. If the download button 502 has been clicked, control proceeds to step S603 in FIG. 6, the resource is downloaded and the values that have been set in the default flag and utilization-flag of the downloaded resource are reflected. A cancel button 503 cancels the settings made on the dialog screen 501 and restores the previous screen.

If the download button 502 on the dialog screen 501 of FIG. 5 is clicked, the resource data designated for downloaded is downloaded at step S603 to the separately designated image forming apparatus. As a result, the data-portion information 405 and data portion 406 having the structure shown in FIGS. 4A to 4C are generated. It should be noted that in the state that prevails immediately after the download, meaningful values have not been written into the attribute section that includes the resource name 401, resource type 402, default flag 403 and utilization flag 404. At this point, only the area in memory has been reserved.

Next, at step S604 in FIG. 6, the settings made on the dialog screen 501 are set as resource attributes with respect to the resource that has been downloaded. That is, the resource attributes are stored in the above-mentioned image forming apparatus in association with the actual data of the resource. At this time the name that has been set in the resource-name section 516 is stored in the resource name 401. In relation to the resource type 402, only a profile is handled in the example of the downloader of this embodiment and therefore content indicating that the resource is a profile is set. Naturally, if the resource is one other than a profile, then values conforming to the type of this resource are set. For example, in a case where the operating system of the administrator personal computer is Windows (registered trademark), the file extension is utilized as the type of resource and the type of resource identified from this extension can be set as the resource type 402 at step S603.

The states of the check boxes 505 to 509 included in the default-flag setting section 504 are reflected and set in the default flag 403. If a check box has been checked, the corresponding bit of the default flag 403 is turned ON (made "1"). If a check box has not been checked, then the corresponding bit of the default flag 403 is turned OFF (made "0").

The states of the check boxes 511 to 515 included in the utilizable-flag setting section 510 are reflected and set in the utilization flag 404. If a check box has been checked, the corresponding bit of the utilization flag 404 is turned ON (made "1"). If a check box has not been checked, then the corresponding bit of the utilization flag 404 is turned OFF (made "0").

The description in connection with FIGS. 5 and 6 deals only with a case where a resource is downloaded anew. However, after an existing resource has been read out from the image forming apparatus 306 to 309, it is possible to delete step S603 in FIG. 6 and perform only the attribute setting of step S604. In this case, the attribute values read out would be reflected in the display of FIG. 5.

<Operation of Resource List Display>

Figure 7:
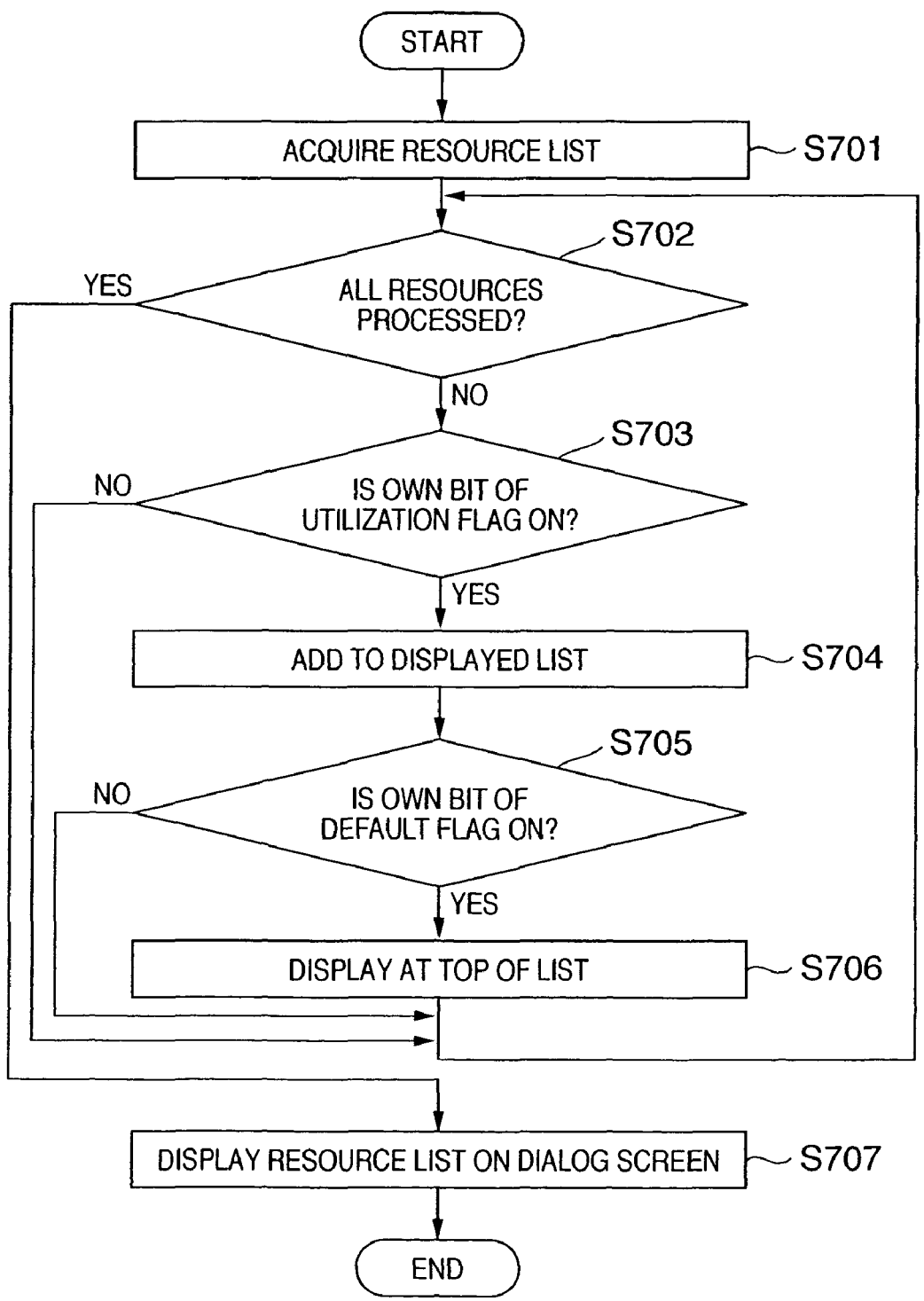
FIG. 7 is a flowchart of resource list processing by a printer driver according to the embodiment.

FIG. 7 is a flowchart of processing executed by a printer driver, which operates in the administrator personal computer 303 or in the client personal computers 304, 305, for displaying, on the user interface of the printer driver, a list of resources having the form of FIG. 4A within an image forming apparatus, the resources having been downloaded by the downloader through the procedure of FIG. 6. For the sake of explanation, it is assumed that this printer driver uses print language PDL2. Accordingly, "OWN BIT" in FIG. 7 refers to the bit corresponding to PDL2. Furthermore, for the sake of simplicity, this description will be rendered on the assumption that only the profile resource handled by the downloader described in connection with FIGS. 5 and 6 exists within the image forming apparatus.

First, at step S701 in FIG. 7, attribute information of all profile resources present in the resource storage area within the image forming apparatus is acquired. Attributes, namely the resource name 401, default flag 403 and utilization flag 404 in FIG. 4A, are included as the acquired attribute information of the resource. Attention is directed toward one of these resources.

Next, at step S702, it is determined whether all resources acquired at step S701 have been processed or not. If it is determined that the processing of all resources has not been finished ("NO" at step S702), then the processing of steps S703 to S706 is executed and control returns to step S702.

The utilization flag 404 of the resource of interest is referred to and it is determined whether the bit for PDL2 is ON or OFF at step S703. The printer driver that executes the procedure of FIG. 7 knows beforehand the position of the flag corresponding to the type of PDL utilized by the printer driver. This can be achieved by retaining the position of the flag to which reference is to be made in a separate table or by retaining it as part of the program code.

If it is found at step S703 that the bit corresponding to PDL in the utilization flag is OFF ("0"), the resource of interest is skipped and control returns to step S702. On the other hand, if it is found at step S703 that the bit corresponding to PDL in the utilization flag is ON ("1"), then the name 401 of the resource of interest is added to the resource list on the user interface of the printer driver at step S704. At this stage, however, the resource is added to the data of the resource list but is not displayed.

Next, at step S705, reference is had to the default flag 403 and it is determined whether the bit corresponding to PDL2 is ON or OFF. If the bit corresponding to PDL2 of the default flag is OFF ("0"), display processing regarding the resource of interest is terminated and control returns to step S702.

If it is found at step S705 that the bit corresponding to PDL2 of the default flag is ON ("1"), then the display field of the resource of interest added on at step S704 is moved to the top of the resource list at step S706 in order to display the resource of interest at the top resource list on the user interface of the printer driver. Control then returns to step S702. At this stage also the resource is added to the data of the resource list and no display is presented. It should be noted that there are other ways to present an indication that makes it possible to recognize that a default has been designated, as by attaching a special mark or the like to a resource for which the default has been designated.

If it is determined that the processing of all resources has been finished ("YES" at step S702), then the list of resources created at steps S704 and S706 is displayed on the user interface of the printer driver at step S707.

Thus, in a computer that uses an image forming apparatus, the device-driver program for the image forming apparatus that has been installed in this computer is capable of displaying a list of resources on the display screen of the user interface. The list of resources is usable by the driver and, moreover, is actually retained in the image forming apparatus. Furthermore, a default resource used in a case where no particular designation has been made is displayed at the top of the list, as a result of which resources that are used ordinarily can be ascertained on the screen of the user interface.

Furthermore, a resource displayed through the procedure of FIG. 7 can be selected on the screen and the attributes regarding the selected resource can be changed through the procedure of FIG. 6. In such case, the downloader of step S603 will be unnecessary.

The description relating to FIG. 7 has been rendered in regard to the driver for PDL2. However, a list of resources can be displayed even with regard to other PDL drivers (drivers for PDL1, PDL3, PDL4 and PDL5), which transmit data to the image forming apparatus of this embodiment, by the processing of FIG. 7 merely by changing the bit referred to at steps S703 and S705.

Thus, as set forth above, a resource retained in a device is managed upon attaching corresponding attributes (the default flag and utilization flag) to the resource on a per-print-language basis (i.e., for every page description language). As a result, an operator who requests print processing by an image forming apparatus can read information of resources utilizable on a per-user basis out of the device that retains the information, display the information on a computer screen, select an appropriate resource from the resources on the screen and designate that this resource be utilized. The designation of a resource to be utilized is incorporated as an instruction in print data generated by a printer driver, by way of example. Upon receiving the print data, the image forming apparatus interprets the instruction that designates this resource and utilizes the designated resource.

It should be noted that the selection of resources by the printer driver need not necessarily rely upon the operator. That is, if, in a case where no particular resource has been specified, there are a plurality of resources utilizable by the PDL supported by the printer driver, then the resources are searched for a resource for which the corresponding bit of the default flag has been set, and an instruction calling for utilization of the resource for which the default bit has been set is embedded in the print data. Thus, one resource retained in a device can be handled by the user of the resource as a resource provided with attributes conforming to the user.

As described above, a resource need not be retained redundantly in an image forming apparatus that supports a plurality of print languages, and a resource that is capable of expressing separate resource features with respect to each print language can be downloaded.

[Second Embodiment]

It is possible for the programs that execute the processing of FIGS. 6 and 7 described in the first embodiment to be recorded on a storage medium such as a floppy disk or CD-ROM. It is also possible to load this storage medium in a data transmitting device such as a personal computer that is capable of reading in the program from the storage medium, transmit the program to the image forming apparatus shown in FIGS. 1 and 2 of the first embodiment connected via various interfaces, and make the program a processing program executed in the controller board 103 or printer controller 203.

[Third Embodiment]

Described next as a third embodiment is a downloader for implementing a resource management method through which names that differ from each other for every print language can be assigned in regard to a single resource.

FIG. 10A is a diagram illustrating the structure of resource data retained on the hard disk 110 of the multifunction copiers 306, 307 shown in FIG. 1 or in the storage device 204 in the printers 308, 309 shown in FIG. 2.

Portions in FIG. 10A similar to those in FIG. 4A need not be described again.

Resource names 1001, 1002, 1003 are utilized as one means for identifying the resource simply. Further, any name is utilized even in a case where it becomes necessary to present a resource list to the user. In this embodiment, three names are retained for every resource.

Name-used information 1004 is information which, in a case where a resource is indicated to a user, indicates under which of the resource names 1001, 1002, 1003 the resource is to be displayed, or whether no display of a resource is to be presented.

The named-used information 1004 has a data structure of the kind shown in FIG. 10B. The image forming apparatus of this embodiment is capable of accepting five types of print languages, namely PDL1, PDL2, PDL3, PDL4 and PDL5, and of interpreting these languages and executing image processing. Accordingly, the named-used information 1004 has defaults (two bits each in this embodiment) for respective ones of the five types of print languages PDL1, PDL2, PDL3, PDL4 and PDL5, thereby indicating whether the name should or should not be displayed in relation to each print language.

In the structure of the named-used information 1004, the field corresponding to the print language PDL1 has a value of "3", indicating that the resource name 1003, which is "NAME3", is used in presenting a display in regard to PDL1.

Further, fields corresponding to print languages PDL2, PDL3 both have a value of "1", indicating that the resource name 1001, which is "NAME1", is used in presenting a display in regard to PDL2, PDL3. Further, the field corresponding to the print language PDL4 has a value of "0", indicating that this resource is not to be displayed.

Further, the field corresponding to the print language PDL5 has a value of "2", indicating that the resource name 1002, which is "NAME2", is used in presenting a display in regard to PDL1.

FIG. 11 is a diagram illustrating an example of a control screen displayed on the monitor 1709 shown in FIG. 8. This is one control screen that the resource downloader of this embodiment displays on the monitor 1709 and corresponds to a dialog screen 1101 for setting attributes of a resource to be downloaded.

On the dialog screen 1101, a NAME1 area 1104 is an input area for the first name "NAME1". This area is for entering a value stored in resource name 1001, which will become "NAME1". A NAME2 area 1105 is an input area for the second name "NAME2". This area is for entering a value stored in resource name 1002, which will become "NAME2".

A NAME3 area 1106 is an input area for third second name "NAME3". This area is for entering a value stored in resource name 1003, which will become "NAME3". An area 1113 for setting display-name information is a user interface for setting information concerning the display name and has pull-down menus 1108, 1109, 1110, 1111, 1112. It is possible to select "0", "1", "2" or "3" in each of the pull-down menus 1108, 1109, 1110, 1111, 1112.

A download button 1102 is clicked when downloading is to be performed. With regard to processing in a case where the download button 1102 has been clicked, the description rendered in regard to the flowchart of FIG. 6 according to the first embodiment basically holds. However, since resource attributes are different from those of the first embodiment, the flowchart will be described again below.

A cancel button 1103 is clicked to cancel the settings made on the dialog screen 1101 and restore the previous screen.

FIG. 6 is a flowchart illustrating an example of data processing executed by a data processing apparatus according to the present invention. This flowchart corresponds to the data processing procedure of the downloader according to this embodiment. In this embodiment (also in the first embodiment), the downloader is adapted so as to be capable of downloading a plurality of resources successively one at a time.

First, it is determined at step S601 whether all resources to be downloaded have been processed or not. If it is determined that the processing of all resources to be downloaded has not been finished ("NO" at step S601), the processing of steps S602 to S604 below is executed with regard to the next resource to be processed and control eventually returns to step S601. In FIG. 6, the flowchart is drawn to show a return from step S604 to step S602.

If it is determined that the processing of all resources to be downloaded has been finished ("YES" at step S601), then processing is exited.

As a result, the dialog screen 1101 shown in FIG. 11 is displayed at step S602 and the settings of resource attributes by the user are accepted. It should be noted that this processing is described only in regard to a case where the download button 1102 is clicked after the dialog screen 1101 is displayed.

If the download button 1102 is clicked, first the resource data is downloaded to the image processing apparatus (inclusive of the printer 308 and multifunction copiers 306, 307 in FIG. 2) at step S603. As a result, the data-portion information 405 and data portion 406 having the structure shown in FIGS. 10A are generated.

Next, at step S604, the settings made on the dialog screen 1101 are set as resource attributes with respect to the resource that has been downloaded. At this time, "NAME1" 1104 is stored in resource name 1001, which becomes "NAME1", "NAME2" 1104 is stored in resource name 1002, which becomes "NAME2", and "NAME3" 1105 is stored in resource name 1003, which becomes "NAME3".

In relation to the resource type 402, only a profile is handled in the example of the downloader of this embodiment and therefore content indicating that the resource is a profile is set.

The values in the pull-down menus 1108 to 1112 included in the area 1113 for setting display name information are reflected and set in the named-used information 1004.

The value specified in the pull-down menu 1108 for print language PDL1 is set in the field for PDL1 in the named-used information 1004, and the value specified in the pull-down menu 1109 for print language PDL2 is set in the field for PDL2 in the named-used information 1004.

Further, the value specified in the pull-down menu 1110 for print language PDL3 is set in the field for PDL3 in the named-used information 1004, the value specified in the pull-down menu 1111 for print language PDL4 is set in the field for PDL4 in the named-used information 1004, and the value specified in the pull-down menu 1112 for print language PDL5 is set in the field for PDL5 in the named-used information 1004.

This description has been rendered only in regard to a case where a resource is downloaded anew. However, after an existing resource has been read out from the image processing apparatus, it is possible to delete step S603 in FIG. 6 and perform only the attribute setting of step S604. In this case, the attribute values read out would be reflected in the display of FIG. 5.

Figure 12:
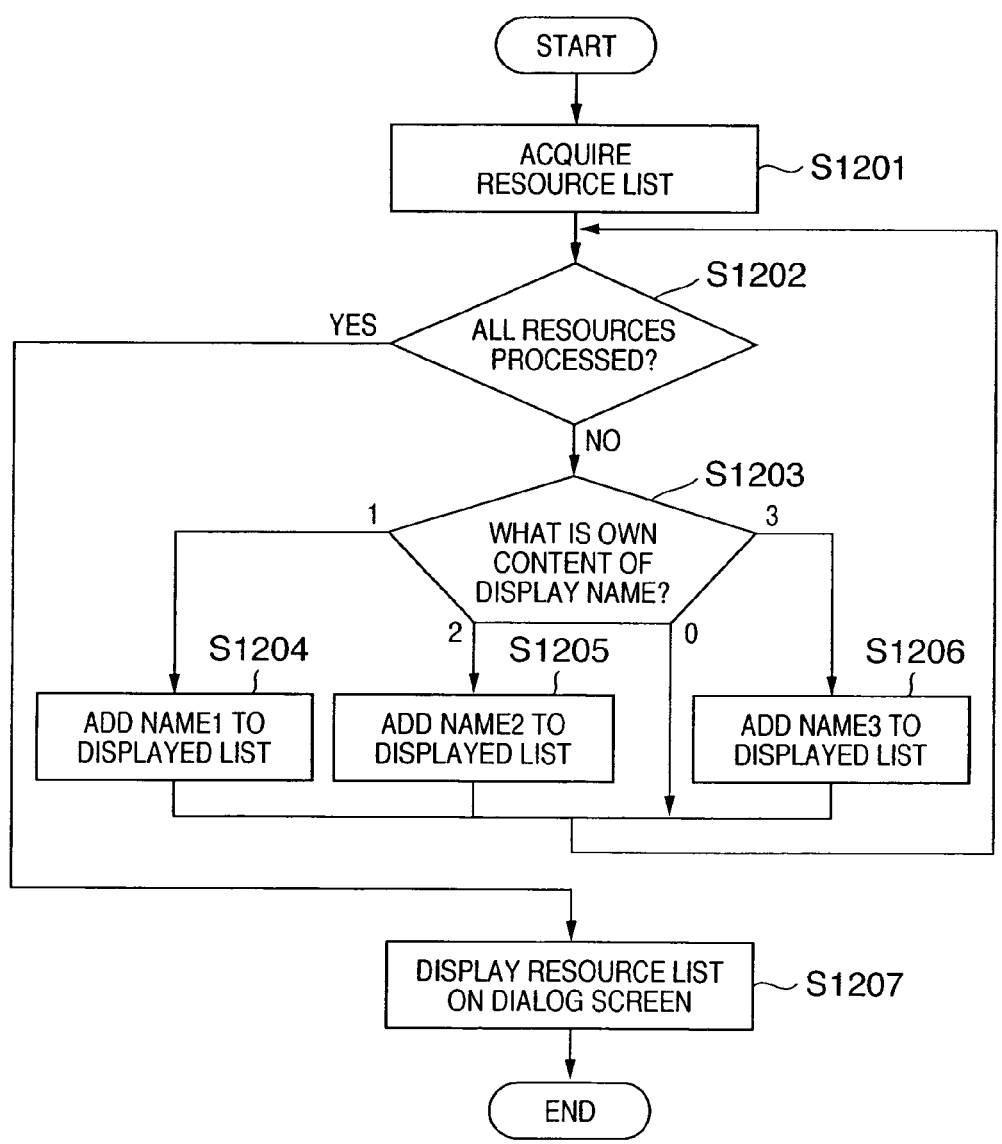
FIG. 12 is a flowchart illustrating an example of second data processing in a data processing apparatus according to the present invention.

FIG. 12 is a flowchart illustrating an example of second data processing in a data processing apparatus according to the present invention. FIG. 12 corresponds to a data processing procedure for displaying resources within an image processing apparatus on a user interface. This is performed by a printer driver, which operates in the administrator personal computer 303 or in the client personal computers 304, 305 and is one example of a program for listing resources having the data format shown in FIGS. 10A, 10B within the image processing apparatus, the resources having been downloaded by the downloader described above in connection with FIGS. 11 and 6. Steps S1201 to S1207 are the steps of this flowchart. Further, for the sake of explanation, it is assumed that this printer driver uses print language PDL2. In addition, since a description relating to the discrimination of resource types not directly related to the present invention is omitted, it will be assumed that only the profile resources handled by the downloader described in connection with FIGS. 11 and 6 exist within the image processing apparatus.

First, at step S1201, all profile resources that exist within the resource storage area in the image processing apparatus are listed. At this time, the attributes shown in FIGS. 10A, 10B, namely the resource name 1001 that becomes "NAME1", the resource name 1002 that becomes "NAME2", the resource name 1003 that becomes "NAME3" and the named-used information 1004, are also acquired in relation to each of the listed resources.

This is followed by step S1202, at which it is determined whether all resources listed at step S1201 have been processed. If it is determined that the processing of all resources has not been finished ("NO" at step S1202), then the processing of steps S1203 to S1206 is executed and control returns to step S1202.

At step S1203, reference is made to the named-used information 1004 of the resource to undergo processing to discriminate the value in the field for print language PDL2. If it is determined that the value is "1", then, at step S1204, the resource name 1001 that becomes "NAME1" is added to the list for displaying the resource in a list on the user interface of the printer driver.

If it is determined at step S1203 that the value is "2", then, at step S1205, the resource name 1002 that becomes "NAME2" is added to the list for displaying the resource in a list on the user interface of the printer driver.

If it is determined at step S1203 that the value is "3", then, at step S1206, the resource name 1003 that becomes "NAME3" is added to the list for displaying the resource in a list on the user interface of the printer driver.

If it is determined at step S1203 that the value is "0", then nothing is added to the list for displaying the resource in a list on the user interface of the printer driver.

On the other hand, if it is found at step S1202 that the processing of all resources has been finished, then the resource list is displayed on the user interface of the driver based upon the list for display in the resource list, which has been created at steps S1204, S1205 and S1206, on the user interface of the driver. Processing is then exited.

The description relating to FIG. 12 has been rendered in regard to the printer driver for print language PDL2. However, a list of resources can be displayed even with regard to other PDL drivers (drivers for PDL1, PDL3, PDL4 and PDL5), which transmit data to the image processing apparatus of this embodiment, by the processing of FIG. 12 merely by changing the field referred to at steps S1203 and S1205.

As described above, a resource need not be retained redundantly in an image processing apparatus that supports a plurality of print languages, and a resource that is capable of expressing separate resource names with respect to each print language can be downloaded.

[Fourth Embodiment]

It is possible for the programs that execute the processing of FIGS. 6, 7 and 13 described in the first to third embodiments to be recorded on a storage medium such as a floppy disk or CD-ROM. It is also possible to load this storage medium in a data transmitting device such as a personal computer that is capable of reading in the program from the storage medium, transmit the program to the image processing apparatus shown in FIGS. 1 and 2 of the first to third embodiments connected via various interfaces, and make the program a processing program executed in the controller board 103 or printer controller 203.

The structure of a data processing program capable of being read out by the data processing apparatus of the present invention will be described with reference to the memory map shown in FIG. 13.

FIG. 13 is a diagram useful in describing a memory map of a storage medium that stores various data processing programs capable of being read out by the data processing apparatus of the present invention.

Though not particularly illustrated, there are also cases where information, such as version number and creator name, etc., for managing a group of programs stored on the storage medium, is stored on storage medium, as well as information, such as an icon for identifying a program, that is dependent upon the operating system on the program read-out side.

Furthermore, data belonging to various programs is managed in a directory. In addition, in a case where a program for installing various programs in a computer or an installed program has been compressed, a decompression program or the like may also be stored on the storage medium.

The functions illustrated in FIGS. 6, 7 and 12 in this embodiment may be executed by a host computer using an externally installed program. In such case the present invention is applicable even in instances where a group of information containing a program is supplied to an output device by a storage medium such as a CD-ROM, flash memory or floppy disk or from an external storage medium via a network.

Thus, the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CDR, magnetic tape, non-volatile type memory card, ROM or EEPROM, etc.

Further, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

The present invention is not limited to the foregoing embodiments and various modifications (inclusive of combinations of the embodiments) can be made based upon the gist of the invention without departing from the scope of the claims thereof.

Thus, in accordance with the present invention, as described above, a resource need not be retained redundantly in an image forming apparatus that supports a plurality of print languages, and it is possible to make a resource express separate resource features with respect to each print language.

Furthermore, a resource need not be retained redundantly in an image forming apparatus that supports a plurality of print languages, and a resource that is capable of expressing separate resource features with respect to each print language can be downloaded.

Furthermore, even if a default resource for which there are a plurality of different print languages is defined, this can be dealt with without retaining the resource in the image forming apparatus redundantly.

Furthermore, even if resources utilizable by a plurality of print languages differ, this can be dealt with without retaining the resource in the image forming apparatus redundantly.

Furthermore, the above-mentioned effects are obtained in relation to font resources, form resources, color-profile resources, look-up table resources and dither-pattern resources.

Furthermore, in accordance with the present invention, only one resource of the same data is allowed to exist in an area within an image processing apparatus, and a plurality of names and information indicating names used in a display on a per-print-language basis are set separately in the image processing apparatus as attributes of each resource. As a result, resources can be retained at one location and a dedicated resource-retention area need not be provided for each print language. In addition, it is no longer necessary to retain, under separate names, identical resources indicating features that differ for every print language. This makes it possible to conserve memory resources.

A further advantage is that the administrator of the image processing apparatus is capable of freely constructing an environment in which resources are managed freely.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus, which communicates with a printer capable of interpreting a plurality of printing languages, that processes image data by using a resource retained in memory, the resource being used for the plurality of printing languages, the data processing apparatus comprising:

retention means for retaining the resource containing data of the resource, which is utilized in image processing on the printer, wherein the resource is for said plurality of printing languages;

input means for inputting, via a graphical user interface, a plurality of display names of the resource retained by said retaining means;

selecting means for selecting, via the graphical user interface, a choice from displaying any one of the plurality of display names input by said input means or not displaying any display name, for each of the plurality of printing languages which are allowed to use the resources;

setting means for setting, to the resource retained by said retention means, the plurality of display names input by said input means and name-use information indicative of correspondence between said plurality of printing languages and display names selected by the selecting means for each of said plurality of printing languages; and transmitting means for transmitting the resource to the printer in response to a transmission instruction input via the graphical user interface, wherein the plurality of display names and the name-use information are set to the transmitted resource, and wherein the printer processes image data by using the transmitted resource;

obtaining means for obtaining the resources from the printer; and display means for referring to the name-use information set to the obtained resources to display a list of the obtained resources by using the display name corresponding to a printing language to be used, wherein when the plurality of resources obtained by said obtaining means includes a resource which is used by the printing language to be used for which a choice is made by said selection means that any display name is not displayed, the display means displays a list not including the resource.

2. The data processing apparatus according to claim 1, wherein the resource is a font resource used in printing, a form resource for forming an image by being superimposed on print data at the time of printing, a color-profile resource that expresses color space of an input/output device, a look-up-table resource, which is a conversion table for color correction in color processing, or a dither-pattern resource, which is pattern data for deciding expression of color in color processing.

3. A data processing apparatus, which communicates with a printer apparatus capable of interpreting a plurality of printing languages, that processes image data by using a resource retained in memory, the resource being used for the plurality of printing languages, the data processing apparatus comprising:

a retention unit constructed to retain the resource containing data of the resource which is utilized in image processing on the printer, wherein the resource is for said plurality of printing languages;

an input unit constructed to input, via a graphical user interface, a plurality of display names of the resource retained by said retention unit;

a selecting unit constructed to select, via the graphical user interface, a choice from displaying any one of the plurality of display names input by the input unit or not displaying any display name, for each of the plurality of printing languages which are allowed to use the resources;

a setting unit constructed to set, to the resource retained by said retention unit, the plurality of display names input by said input unit and name-use information indicative of correspondence between said plurality of printing languages and display names selected by said selecting unit for each of said plurality of printing languages;

a transmitting unit constructed to transmit the resource to the printer in response to a transmission instruction input via the graphical user interface, wherein the plurality of display names and the name-use information are set to the transmitted resource, and the printer processes image data by using the transmitted resource;

an obtaining unit constructed to obtain the resources from the printer; and a display unit constructed to refer to the name-use information set to the obtained resources to display a list of the obtained resources by using the display name corresponding to a printing language to be used, wherein when the plurality of resources obtained by the obtaining unit includes a resource which is used by the printing language to be used for which a choice is made by the selection unit that any display name is not displayed, the display unit displays a list not including information regarding the resource.

4. A data processing method that is performed by a data processing apparatus communicating with a printer capable of interpreting a plurality of printing languages, that processes image data by using a resource retained in memory, the resource being used for the plurality of printing languages, said method comprising:

retaining the resource containing data of the resource, which is utilized in image processing on the printer, wherein the resource is for said plurality of printing languages;

inputting, via a graphical user interface of the data processing apparatus, a plurality of display names of the resource retained in the retaining step;

selecting, via the graphical user interface of the data processing apparatus, a choice from displaying any one of the plurality of display names input in the inputting step or not displaying any display name, for each of the plurality of printing languages which are allowed to use the resources;

setting, to the resource retained in the retaining step, the plurality of display names input in the inputting step and name-use information indicative of correspondence between said plurality of printing languages and display names selected in the selecting step for each of said plurality of printing languages; and transmitting by the data processing apparatus the resource to the printer in response to a transmission instruction input via the graphical user interface, wherein the plurality of display names and the name-use information are set to the transmitted resource, and the printer processes image data by using the transmitted resource;

obtaining the resources from the printer; and referring to the name-use information set to the obtained resources to display a list of the obtained resources by using the display name corresponding to a printing language to be used, wherein when the plurality of resources obtained in the obtaining step includes a resource which is used by the printing language to be used for which a choice is made in the selecting step that any display name is not displayed, a list not including any information regarding the resource is displayed in the displaying step.

5. The method according to claim 4, wherein the resource is selected from the group including a font resource used in printing, a form resource for forming an image by being superimposed on print data at the time of printing, a color-profile resource that expresses color space of an input/output device, a look-up-table resource, which is a conversion table for color correction in color processing, and/or a dither-pattern resource, which is pattern data for deciding expression of color in color processing.

6. A non-transitory computer-readable storage medium storing a computer program for communication of a data processing apparatus with a printer capable of interpreting a plurality of printing languages, that processes image data by using a resource retained in memory, the resource being used by the plurality of printing languages, said computer program comprising:

code for retaining the resource containing data of the resource, which is utilized in image processing on the printer, wherein the resource is for said plurality of printing languages;

code for inputting, via a graphical user interface of the data processing apparatus, a plurality of display names for the resource retained in the retaining step;

code for selecting, via the graphical user interface of the data processing apparatus, a choice from displaying any one of the plurality of display names input in the inputting step or not displaying any display name, for each of the plurality of printing languages which are allowed to use the resources;

code for setting, to the resource retained in the retaining step, the plurality of display names input by said input code and name-use information indicative of correspondence between said plurality of printing languages and display name selected in the selecting step for each of said plurality of printing languages; and code for transmitting the resource to the printer in response to a transmission instruction input via the graphical user interface, wherein the plurality of display names and the name-use information are set to the transmitted resource, and the printer processes image data by using the transmitted resource;

code for obtaining the resources from the printer; and code for referring to the name-use information set to the obtained resources to display a list of the obtained resources by using the display name corresponding to a printing language to be used, wherein when the plurality of resources obtained in the obtaining step includes a resource which is used by the printing language to be used for which a choice is made in the selecting step that any display name is not displayed, a list not including any information regarding the resource is displayed in the displaying step.

7. The non-transitory computer-readable medium storing a computer program according to claim 6, wherein the resource is selected from the group including a font resource used in printing, a form resource for forming an image by being superimposed on print data at the time of printing, a color-profile resource that expresses color space of an input/output device, a look-up-table resource, which is a conversion table for color correction in color processing, and/or a dither-pattern resource, which is pattern data for deciding expression of color in color processing.

* * * * *